Patented June 13, 1950

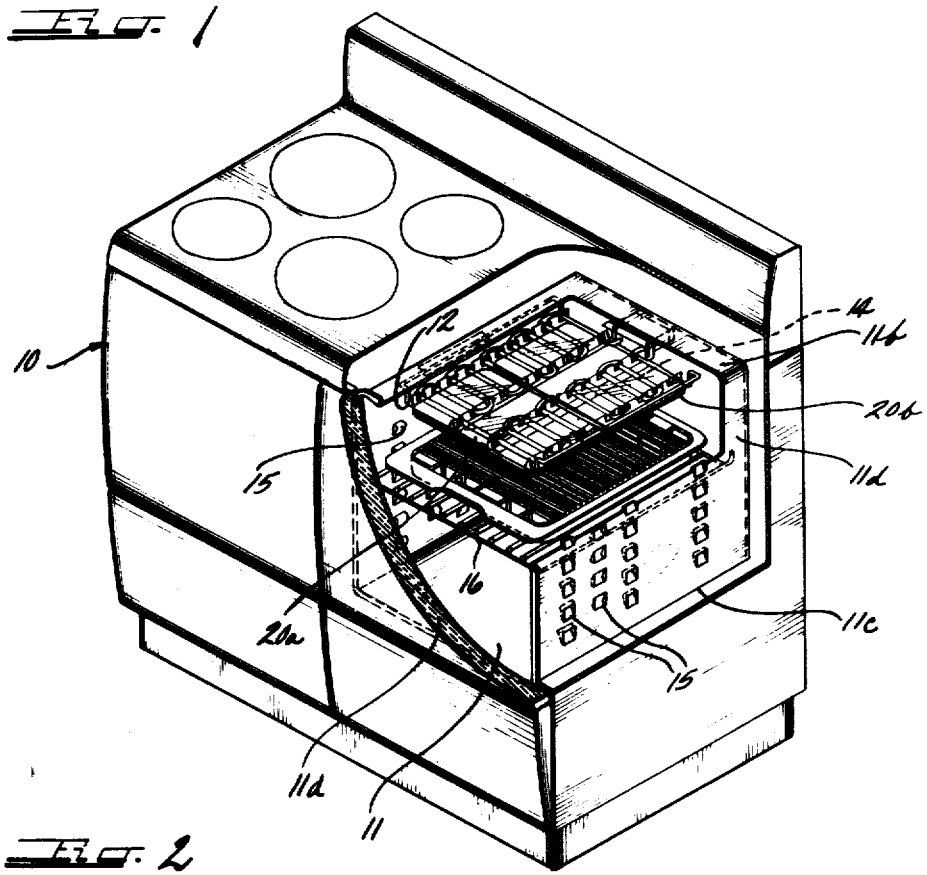
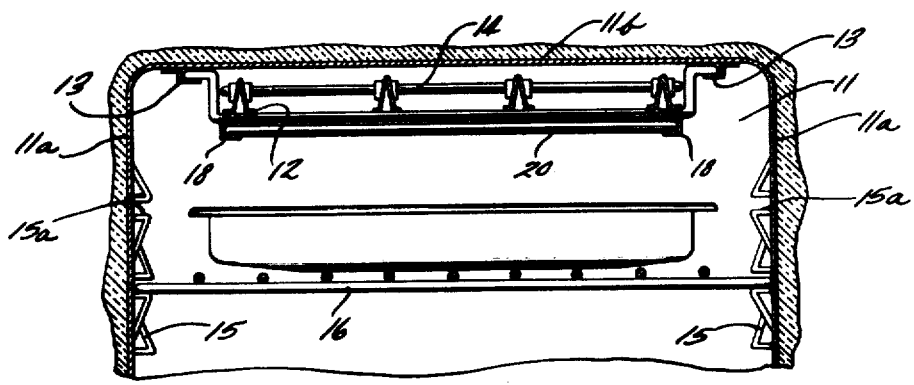

2,511,790

UNITED STATES PATENT OFFICE 2,511,790

HEATING ASSEMBLY FOR BROILERS

Donald W. Scofield, Detroit, Mich., assignor, by mesne assignments, to Philco Corporation, a corporation of Pennsylvania Application September 4, 1947, Serial No. 772,136

3 Claims. (Cl. 99—324)

This invention relates to a cooking device, and particularly to an improved broiler construction for effecting the cooking of food articles at high temperatures without the production of any substantial amount of smoke.

As is well known to any housewife, the broiler elements employed in conventional cooking stove construction provide a heating element, constituting either a gas burner or an electrical resistance heating coil which is disposed in closely spaced relationship with respect to a tray or container upon which the food articles to be cooked are placed. With such conventional construction, even though the temperature of the food articles is not permitted to rise to the point where such food articles are charred and thereby produce smoke, nevertheless a substantial quantity of smoke is generated within the broiler or oven unit. Most of such smoke is produced by the spattering of grease or similar liquid from the food articles to be cooked upon the extremely hot surfaces of the burner element or heating coil. Such grease spatterings either burn or smolder upon the heating element and, in any event, produce large quantities of obnoxious smoke which may find its way to the kitchen unless an elaborate exhaust system is provided. Even with a good exhaust system, the opening of the broiler compartment to remove the food articles at the close of the cooking operation or to turn the food articles at an intermediate stage permits the ever present smoke in the broiler to escape into the room.

It has been further observed that the conventional broiling operation does not accomplish the even heating of all parts of the food articles disposed on the broiler tray. Particularly in the case of electrical broilers it may be readily observed that those portions of the food articles lying directly beneath the heating coil are heated to a higher temperature, hence cooked more rapidly than adjacent potrions. This phenomenon is undoubtedly due to the fact that broiling is primarily accomplished by radiated heat and obviously the intensity pattern of the heat radiation will, at distances close to the source of the radiation, correspond generally to the shape of the radiating element. This fact has been another source of smoke in the broiling operation inasmuch as it is sometimes necessary to actually burn portions of the food articles directly underlying the heating element in order to assure that adjacent portions of the food articles will be properly cooked.

Accordingly, it is an object of this invention to provide an improved cooking device, and particularly an improved broiler construction for effecting the uniform broiling of food articles without the production of any substantial quantity of smoke.

A particular object of this invention is to provide a shield member between a heating element and the tray for supporting articles to be broiled by the heating element, such shield acting to prevent the spattering of grease from the food articles upon the heating element and thereby eliminate the major source of smoke in the broiling operation, and having the further property of diffusely transmitting heat radiation received from the heating element to more uniformly heat the food articles.

Still another object of this invention is to provide an improved electric broiler construction embodying a glass plate disposed intermediate an electrical heating coil and the tray for supporting food articles to be broiled by such heating element.

The specific nature of the invention, as well as other objects and advantages thereof, will become apparent to those skilled in the art from the following detailed description taken in conjunction with the attached sheet of drawings, which, by way of preferred example only, illustrate one embodiment of this invention.

On the drawings:

Figure 1 is a perspective view, with parts broken out for clarity, of a domestic type cooking stove embodying this invention; and Figure 2 is an enlarged scale, vertical sectional view taken through the oven compartment of the cooking stove of Figure 1.

As shown on the drawings:

While this invention will be particularly illustrated and described in connection with its application to a domestic type electric range, it should be clearly understood that the principles thereof are applicable to any form of cooking device operating according to the broiling principle and is not limited to the utilization of an electrical resistance heating coil as the source of heat for the broiling operation.

In Figure 1 there is shown a modern type electric range 10 having in one side portion thereof an insulated oven compartment 11 defined by side walls 11a, top wall 11b, bottom wall 11c and a front door 11d. Near the top of oven compartment 11 a heating element support frame 12 is suitably secured therein, as by angle brackets 13 secured in depending relationship to the top wall 11b of the oven compartment. An electrical heating coil 14 is supported upon the frame 12 in conventional fashion, the various turns of the heating coil 14 being all disposed in substantially the same horizontal plane.

Beneath the heating element 14 the side walls 11a of the oven compartment 11 are provided with a plurality of pairs of opposed bumps or brackets 15 which are arranged in conventional fashion to define a plurality of vertically spaced tracks 15a for selectively receiving the supporting wire grids 16. A broiling tray 17 may then be supported upon the wire grid 16 so as to in turn support the food articles to be broiled in spaced relationship beneath the heating element 14.

It will be recognized that the arrangement thus far described represents merely a conventional broiling arrangement. Now, in accordance with this invention, the support frame 12 is provided with a plurality of depending angle brackets 18 along the two opposed sides of its periphery. The brackets 18 are utilized to support a shield element 20 in a generally horizontal position intermediate the heating element 14 and the tray 17 upon which the food articles to be broiled are placed. The shield element 20 is preferably shaped so as to have an area not less than that of the heating element 14 and is vertically aligned with the heating element 14 so as to shield such heating element from all grease spatterings which might be produced by the application of broiling heat to the food articles.

The shield element 20 is formed of a material which is stable at temperatures approaching the maximum temperature of the heating element 14 and, in addition, of a material having the property of transmitting radiant heat. Preferably, the shield element 20 is formed of material having the property of diffusively transmitting at least a substantial portion of any radiant heat applied to one face thereof. It is therefore apparent that any translucent refractory material may be utilized to form the shield element 20 and I preferably utilize a plate formed of heat shock resistant glass of which several varieties are commercially available.

In order to reduce the replacement cost of the shielding element 20 in the event of breakage of such shielding element by rough handling, I preferably form the shielding element by side by side alignment of two plates 20a and 20b each being approximately one-half of the total area required for the shielding element 20. Such plates may be conveniently assembled in operative relationship with respect to the heating element 14 or removed therefrom by their slidable mounting in the depending angle brackets 18. Hence the shielding element 20 may be readily removed and replaced for cleaning purposes.

With the aforedescribed construction, it has been found that substantially smokeless broiling can be accomplished, providing, of course, that the temperature of the food articles being broiled is not permitted to exceed the charring temperature. Even though the heating element 14 is maintained at a temperature which would immediately ignite grease splattering thereon, it has been observed that the grease splattering upon the underface of the shielding plate 20 is neither burned nor smoldered. Furthermore, the described arrangement produces an improved distribution of radiant heat onto the food articles being broiled. While the exact theory as to the manner in which the shielding element 20 accomplishes such evening of radiant heat distribution has not been ascertained with certainty, the most logical explanation appears to lie in the belief that in the transmission of heat radiation through the shielding plate 20, the radiation is diffused so that on the side of the shielding plate 20 remote from the heating element 14, the heat radiation pattern resembles those produced by a radiating plate. In any event, it has been definitely ascertained that the construction of this invention definitely improves the broiling operation and, at the same time, substantially eliminates the production of smoke during the broiling operation.

It will, of course, be understood that various details of construction and materials may be modified through a wide range without departing from the principles of this invention, and it is, therefore, not the purpose to limit the patent granted hereon otherwise than necessitated by the scope of the appended claims.

I claim as my invention:

1. In an enclosed oven adapted for the broiling of foods, heating means generally defining a predetermined planar area for radiation therefrom of energy in the infrared portion of the spectrum, means for supporting meats or other food to be broiled in close proximity to said heating means and in position such as to receive infrared radiation sufficient to raise the temperature of the food to the broiling point, the broiling of the food causing expulsion therefrom of droplets which if permitted to spatter on said heating means would produce smoking, and means for preventing the production of smoke, said last means comprising a shielding member interposed between said heating means and said support means and being sufficiently transparent to infrared rays to have a working surface temperature insufficient to produce substantial smoking in response to spattering thereon of the aforementioned droplets.

2. In a broiler oven, a heating element of the radiant type supported in spaced relation from the upper wall of said oven and means for supporting a tray in said oven at a level below said heating element, suitable for broiling food supported thereon, the improvement which comprises a heat shock resistant plate at least substantially coextensive in over-all area with and supported below said heating element and separated by an unobstructed air space from said food supporting tray therebeneath and within food spattering distance therefrom, said plate being relatively transparent to infrared rays whereby in the use of said broiler the temperature of the lower surface of said plate remains at a value below that at which there will be any substantial smoking or burning of material spattered thereon.

3. In a broiler oven, an electrical heating element supported in spaced relation from the oven upper wall and providing exposed heat radiating surfaces and means for positioning a tray in said oven below said heating element at a level suitable for broiling food supported thereon, the improvement which comprises a heat shock resistant glass plate removably supported between said heating element and said tray to serve as the sole and effective shield preventing said heating element from being spattered by particles from the food being broiled, said glass plate being sufficiently transparent to infrared rays and being a sufficiently poor conductor of heat that the temperature of the lower surface of said plate remains at a value below that at which there will be any substantial smoking or burning of particles spattered thereon from said food during broiling thereof.

DONALD W. SCOFIELD.

REFERENCES CITED

The following references are of record in the file of this patent:

UNITED STATES PATENTS

| Number | Name | Date |
|---|---|---|
| 585,442 | Jenkins | June 22, 1897 |
| 1,245,030 | Rockwell | Oct. 30, 1917 |
| 2,040,675 | Shroyer | May 12, 1936 |
| 2,179,934 | Jones | Nov. 14, 1939 |
| 2,214,630 | Wheeler | Sept. 10, 1940 |
| 2,221,595 | Lockwood | Nov. 12, 1940 |
| 2,234,596 | Heilman | Mar. 11, 1941 |
| 2,263,866 | Barber | Nov. 25, 1941 |
| 2,300,837 | Ames | Nov. 3, 1942 |
| 2,375,047 | Sutherland | May 1, 1945 |
| 2,428,090 | Naeher et al. | Sept. 30, 1947 |